(12) United States Patent
Tucker et al.

(10) Patent No.: US 8,616,499 B2
(45) Date of Patent: Dec. 31, 2013

(54) WING STRUCTURE

(75) Inventors: Michael Tucker, Filton (GB); Timothy Sanderson, Filton (GB)

(73) Assignee: Airbus Operations Limited, Bristol (GB)

( * ) Notice: Subject to any disclaimer, the term of this patent is extended or adjusted under 35 U.S.C. 154(b) by 50 days.

(21) Appl. No.: 13/263,215

(22) PCT Filed: Mar. 31, 2010

(86) PCT No.: PCT/GB2010/050555
§ 371 (c)(1),
(2), (4) Date: Oct. 6, 2011

(87) PCT Pub. No.: WO2010/116170
PCT Pub. Date: Oct. 14, 2010

(65) Prior Publication Data
US 2012/0037755 A1 Feb. 16, 2012

(30) Foreign Application Priority Data
Apr. 9, 2009 (GB) .................................. 0906157.3

(51) Int. Cl.
*B64C 3/00* (2006.01)
(52) U.S. Cl.
USPC ........................... 244/123.1; 29/428; 264/238
(58) Field of Classification Search
USPC ........................... 244/123.1; 416/226; 29/428
See application file for complete search history.

(56) References Cited

U.S. PATENT DOCUMENTS

| | | | | |
|---|---|---|---|---|
| 2,443,323 A * | 6/1948 | Nebesar | ..................... | 244/123.8 |
| 3,907,442 A | 9/1975 | Reid | | |
| 4,219,980 A * | 9/1980 | Loyd | ........................... | 52/309.1 |
| 4,256,790 A * | 3/1981 | Lackman et al. | ............... | 428/73 |
| 4,298,417 A * | 11/1981 | Euler et al. | ..................... | 156/228 |
| 4,331,495 A * | 5/1982 | Lackman et al. | ............... | 156/93 |
| 5,476,704 A | 12/1995 | Kohler | | |
| 5,833,786 A * | 11/1998 | McCarville et al. | ............ | 156/92 |
| 6,116,539 A * | 9/2000 | Williams et al. | ................ | 244/46 |

(Continued)

FOREIGN PATENT DOCUMENTS

| | | |
|---|---|---|
| CN | 1489637 A | 4/2004 |
| DE | 3128581 A | 2/1983 |

(Continued)

OTHER PUBLICATIONS

British Search Report for GB 0906157.3 dated Aug. 10, 2009.

(Continued)

*Primary Examiner* — Christopher P Ellis
*Assistant Examiner* — Medhat Badawi
(74) *Attorney, Agent, or Firm* — Lowe Hauptman & Ham, LLP

(57) ABSTRACT

A wing structure is provided, wherein the wing structure comprises; an upper covering, a lower covering, and a spar, the spar comprising; a spar web, an upper spar cap attached to the upper covering, and a lower spar cap attached to the lower covering, the wing structure also comprising a face spaced apart from the spar web extending between the upper and lower spar caps. The wing structure is arranged to contain fuel in a fuel containment area between the upper and lower coverings on one side of the spar web. The upper and lower spar caps extend from the spar web only on the other side of the spar web to the fuel containment area.

18 Claims, 4 Drawing Sheets

(56) References Cited

U.S. PATENT DOCUMENTS

| | | | |
|---|---|---|---|
| 6,190,484 B1* | 2/2001 | Appa | 156/189 |
| 6,638,466 B1* | 10/2003 | Abbott | 264/238 |
| 6,786,452 B2* | 9/2004 | Yamashita et al. | 244/123.1 |
| 7,052,572 B2* | 5/2006 | Miura et al. | 156/286 |
| 7,513,769 B2 | 4/2009 | Benson et al. | 425/374 |
| 7,901,184 B2* | 3/2011 | Nies et al. | 416/132 B |
| 7,905,706 B1* | 3/2011 | Liang | 416/96 R |
| 8,165,703 B2 | 4/2012 | Gallego et al. | 700/98 |
| 8,226,787 B2* | 7/2012 | Benson et al. | 156/212 |
| 2006/0027703 A1* | 2/2006 | Bussom et al. | 244/17.13 |
| 2006/0226291 A1 | 10/2006 | Law | |
| 2007/0177330 A1* | 8/2007 | Ackerman et al. | 361/220 |
| 2009/0025865 A1* | 1/2009 | Weidmann et al. | 156/199 |
| 2010/0181427 A1* | 7/2010 | Makela | 244/123.12 |
| 2011/0268603 A1 | 11/2011 | Chakrabarti et al. | |

FOREIGN PATENT DOCUMENTS

| | | |
|---|---|---|
| GB | 130695 A | 8/1919 |
| GB | 162918 A | 5/1921 |
| GB | 491302 A | 8/1938 |

OTHER PUBLICATIONS

International Search Report for PCT/GB2010/050555 mailed Nov. 18, 2010.

Notice on the First Office Action for Patent Application No. 201080016640.1 dated Jul. 2, 2013.

\* cited by examiner

WING STRUCTURE

RELATED APPLICATIONS

The present application is a National Phase of International Application Number PCT/GB2010/050555, filed Mar. 31, 2010 and claims priority from, British Application Number 0906157.3, filed Apr. 9, 2009.

BACKGROUND OF THE INVENTION

The present invention relates to the field of wing structures, and in particular to aircraft wing structures. The present invention also relates to a method of assembly of a wing structure and to a wing spar.

An aircraft wing box is a wing structure and generally includes the structural members of the wing such as front and rear spars, ribs, braces, struts etc. The upper and lower skins of the wing enclose the wing box. Generally, the roots of the front and the rear spars are connected to the fuselage.

The spars and other structural members of a wing structure are generally fastened together using metal fasteners, such as rivets or metal nuts and bolts. These metal fasteners extend through the thickness of the members to be fastened. For example, a spar is usually fastened to a wing skin by fastening a metal fastener through a hole in a spar cap of the spar and a corresponding hole in the wing skin. Hence, the metal fastener extends from the outside surface of the wing to an underside of the spar cap.

Most large aircrafts have fuel tanks inside the wings. The fuel tanks inside the wings are generally contained between the front and rear spars. Therefore, the metal fasteners used to fasten the spars to the wing skins extend from the outside wing surface into the fuel tank.

Since aluminium alloy, commonly used in aircraft, is highly electrically conductive, a transient charge from lightning striking a metal fastener discharges into the rest of the aircraft structure with current from the discharge being distributed relatively evenly over the aircraft. Therefore, a typical lightning strike to a metal aircraft causes either no or only minor damage to aircraft components.

Composite materials (such as carbon fibre) are increasingly being used in aircraft manufacture due to their higher strength-to-weight ratio compared to aluminium alloy. However, typical composite materials are much more electrically resistive than aluminium alloy. For example, Carbon Fibre Reinforced Plastic (CFRP) is at least 2000 times more resistive than aluminium.

As the composite material is an electrical insulator, any lightning that hits the metal fastener is not easily dissipated within a composite wing skin. This can increase the risk of sparks or ignition of fuel in the region of the fastener. Furthermore, metal fasteners on an exposed composite surface are most susceptible to a direct lightning strike.

Accordingly, composite structures on an aircraft typically have some protection where a metal fastener extends into a fuel tank region. This is because any ignition events in a region of the metal fastener could risk ignition of fuel in the fuel tank. Unfortunately, typical lightning strike protection approaches are complicated and difficult to implement. For example, complex sealing or electrical bonding techniques are often used.

The present invention seeks to provide a wing structure, especially a composite wing structure that provides improved lightning protection. Additionally, or alternatively, the invention seeks to provide a wing structure, especially a composite wing structure that provides improved bird strike protection. Additionally, or alternatively, the invention seeks to provide an improved wing structure.

SUMMARY OF THE INVENTION

According to one aspect of the present invention there is provided a wing structure wherein the wing structure comprises an upper covering, a lower covering, and a spar, the spar comprising a spar web, an upper spar cap attached to the upper covering, and a lower spar cap attached to the lower covering, and wherein the wing structure is arranged to contain fuel in a fuel containment area between the upper and lower coverings on one side of the spar web, and wherein the upper and lower spar caps extend from the spar web only on the other side of the spar web to the fuel containment area.

In the context of the present invention, the spar caps may be defined as the elements of the spar that provide for attachment of the spar to the wing coverings. In general, the spar caps extend approximately perpendicularly to the spar web.

In the present invention, the spar caps extend from the spar web only on one side of the spar web (the side opposite the fuel containment area). This does not preclude other parts of the spar extending away from the spar web on the fuel containment side. For example, there may be non-structural elements of the spar located on the fuel containment side of the spar web, such as spar brackets. There may also be structural elements, such as ribs, or rib posts, on the fuel containment side of the spar web. In addition, there may be elements of the spar that appear to be spar caps on the fuel containment side but that do not, in fact, provide for attaching of the spar to the wing coverings.

The wing structure of an embodiment of the invention described below has a spar that is only attached to the upper and lower spar coverings by the spar caps in a region outside of the fuel containment area. Hence, any metal fasteners used to fasten the wing coverings and spars together do not extend into the fuel tank. In addition, it has been found that such a wing structure with an outward facing C-shaped section spar has an increased capacity for withstanding fuel pressures over one with traditional inward facing C-shaped section spars.

Preferably, the wing structure comprises a face, the face being spaced apart from the spar web extending between the upper and lower spar caps.

In the illustrated embodiments, the face is located on the other side of the spar web to the fuel containment area and faces outwards from the spar web.

Such a face provides additional structure in front of the front spar or behind the rear spar. This is particularly beneficial in relation to the front spar as it provides additional structure to protect the front spar and absorb damage caused by impacts such as bird strikes.

Preferably, systems cables are run along a length of the spar in between the spar web and the face. This provides improved segregation of the system cables and provides additional protection of the system cables from bird strike as the cables are contained behind the face.

Preferably, a leading or trailing edge structure is mounted on a plate or joining structure before the plate/joining structure is mounted to the rest of the wing structure. This allows the leading or trailing edge structures to be fully assembled and equipped before they are attached to the wing structure. This simplifies assembly.

Preferably, the leading or trailing edge structure is mounted on the plate/joining structure using an angled bracket, the bracket having slotted attachment holes for fixing to the plate. This allows the covers to be adjusted to suit the airflow profile steps caused by the variation in the cover thickness tolerances. Using slotted holes and angled attachments allows this adjustment without the need for using buttstraps and spreader plates. These require fettling, which is time consuming and costly.

Preferably, the face, plate and/or joining structure has a recessed section. This allows system cables to be run along a length the spar in the recessed section. This simplifies the integration of the leading and trailing edge structures.

The present invention also provides an aircraft comprising such a wing structure.

The present invention also provides a method of assembly of a wing structure, the method comprising the steps of fully assembling a leading or trailing edge structure, attaching the leading/trailing edge structure to a mounting structure, and then attaching the mounting structure to a spar of the wing structure. Preferably, the mounting structure is a plate. Such a method allows complete fully equipped leading and trailing edge structures to be built away from the main assembly jig and then attached as complete assemblies to the wing box. This can improve build rates. In addition, disassembly for repair and maintenance of the leading and trailing edges structures could be carried out while still leaving the fuel containment area undisturbed.

The present invention also provides a wing spar wherein the upper spar cap of the wing spar comprises a mounting flange and the lower spar cap comprises a mounting flange, the mounting flanges extending away from the respective spar cap towards the opposite spar cap. A joining structure is attached to the mounting flanges of the upper and lower spar caps to form a box-section spar.

Preferably, the spar web, upper spar cap and lower spar cap are made from composite material.

The present invention is of greater application to relatively large commercial aircraft. The aircraft is preferably heavier than 30 tonnes dry weight, and more preferably heavier than 100 tonnes, or even 200 tonnes dry weight. The aircraft is preferably of a size equivalent to an aircraft designed to carry more than 75 passengers, and more preferably more than 200 passengers. The aircraft preferably has a wing span of at least 20 meters, and more preferably at least 40 m. The spar of the wing could typically have a height of 150 mm or more at the outboard end.

DESCRIPTION OF THE DRAWINGS

An aircraft wing structure, embodying the present invention will now be described, by way of example only, with reference to the accompanying Figures, in which.

DETAILED DESCRIPTION

Figure 1:
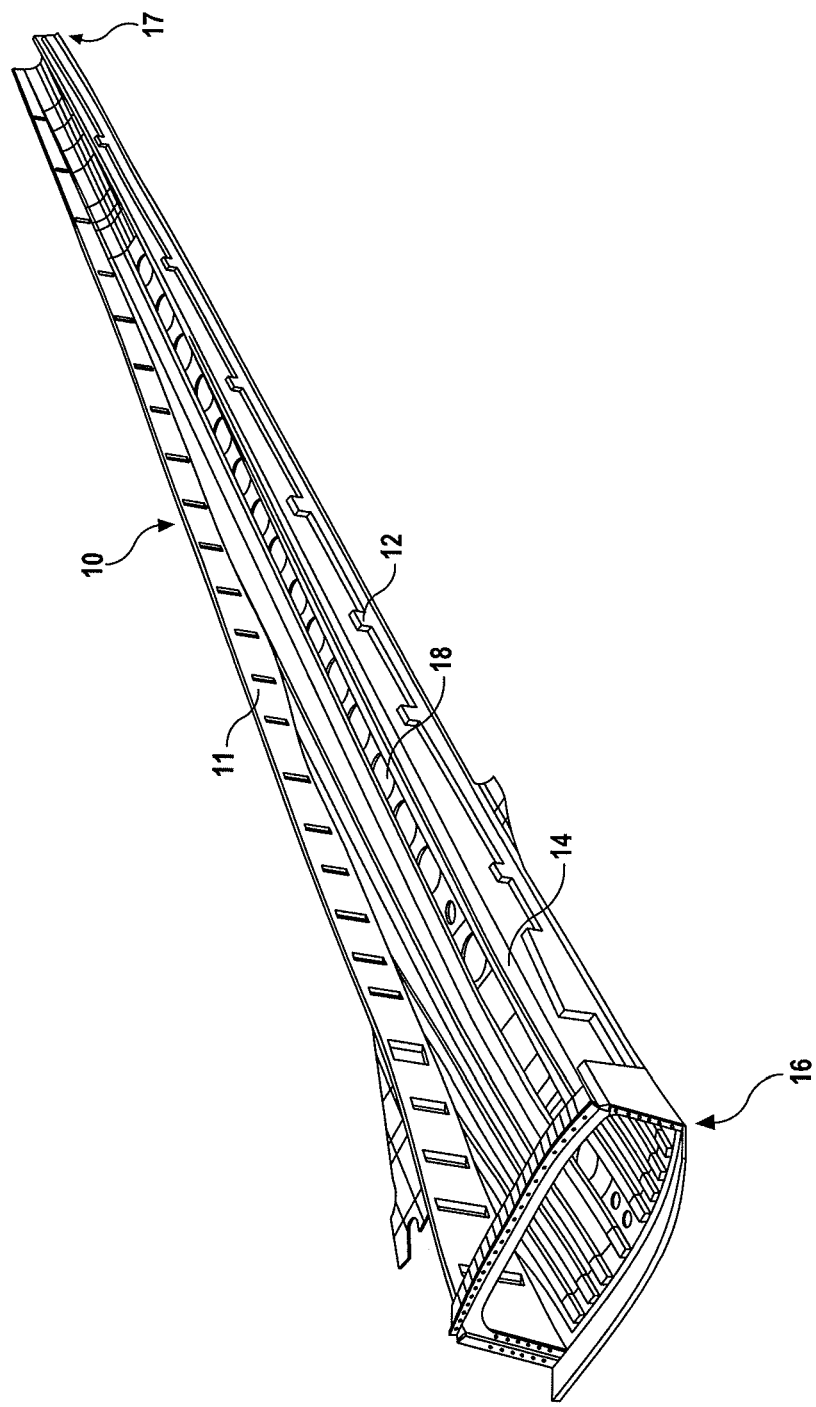
FIG. 1 is a perspective view of a prior art wing box with a top wing cover omitted for clarity.

A wing box structure 10' is shown generally in FIG. 1. It has a generally trapezoidal shape in plan and a generally rectangular cross-section. The wing box 10' extends from a root section 16' where the wing box 10' cross-section is biggest to a tip section 17' at an opposite end, where the wing box 10' cross-section is smallest.

The wing box 10' is made up of various structural members. A front spar 12' runs along a front face of the wing box 10' from the root 16' to the tip 17'. A rear spar 11' runs along a rear face of the wing box 10' from the root 16 to the tip 17'.

The wing box 10' has a lower cover 14' with a generally trapezoidal shape. The lower cover 14' extends between the front 12' and rear 11' spars and from the root section 16' to the tip section 17'. The lower cover 14' has sixteen apertures 18' along a longitudinal axis of the lower cover 14'. The upper cover has been omitted from FIG. 1 for clarity.

Figure 2:
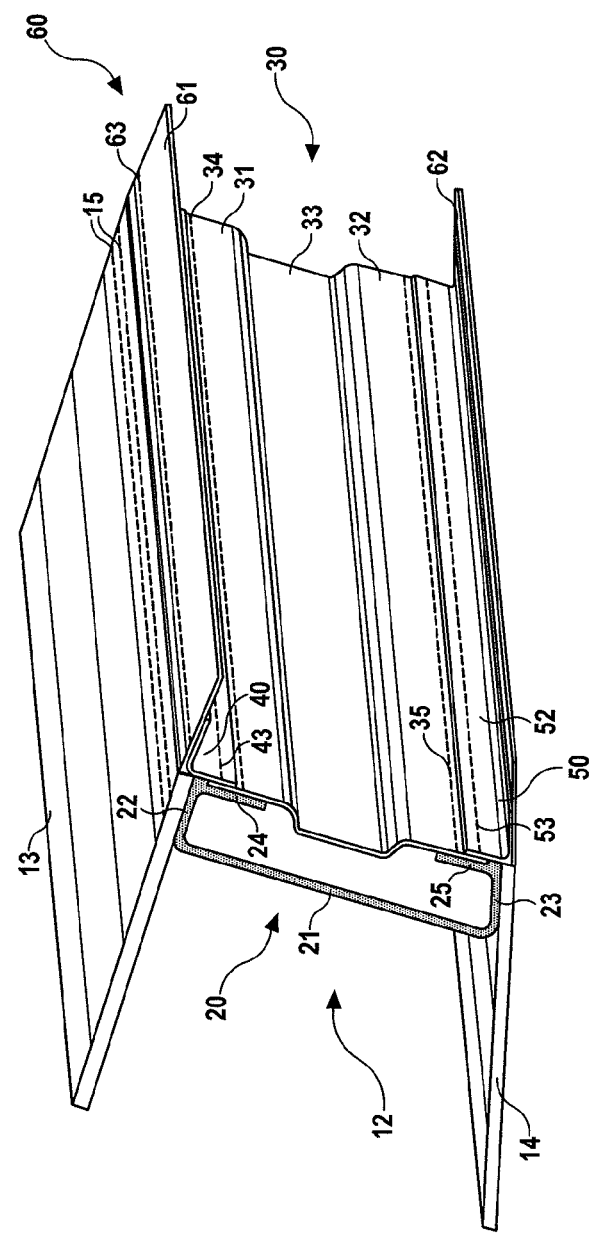
FIG. 2 is a perspective view of part of a wing box according to the present invention, showing a front spar and upper and lower wing covers.

The wing box shown partially in FIG. 2 is similar, in terms of general layout, to the prior art wing box 10' of FIG. 1. Reference numerals referring to features in FIG. 2 that correspond to those in FIG. 1 will take the reference numeral used in FIG. 1 without the ' suffix.

The wing box 10 shown in FIG. 2 differs from the prior art wing box 10' of FIG. 1 in that the front 12 and rear 11 spars have a different construction and are fastened to the upper 13 and lower 14 covers differently.

Figure 3:
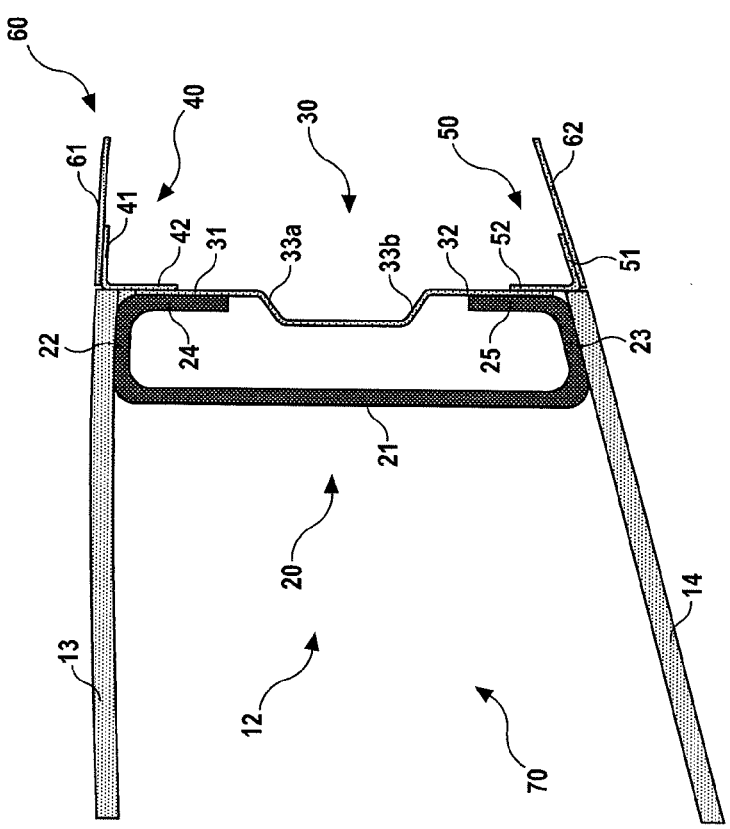
FIG. 3 is a side view of the part of the wing box of FIG. 2.

FIGS. 2 and 3 show a front spar 12 attached at one edge of upper 13 and lower 14 covers of the wing box 10.

The front spar 12 is made up of two parts; a main C-shaped section 20 and a front plate 30. The main C-shaped section 20 and front plate 30 form a box-section.

The main section 20 has an approximately vertical spar web 21. An upper spar cap 22 extends approximately horizontally outwards from the top of the spar web 21. A lower spar cap 23 extends approximately horizontally outwards from the bottom of the spar web 21. The lower spar cap 23 is slightly inclined upwards in order to follow an upwards slope of the inside of the lower cover 14. The upper 22 and lower 23 spar caps have similar lengths.

At the end of the upper spar cap 22 is an approximately vertical upper mounting flange 24. The upper mounting flange 24 extends downwardly from the upper spar cap 22. The upper mounting flange 24 has a length approximately equal to the length of the upper spar cap 22. Similarly, an approximately vertical lower mounting flange 25 extends upwards from the lower spar cap 23. The lower mounting flange 25 has a length approximately equal to the length of the lower spar cap 23. The upper 24 and lower 25 mounting flanges are at the same angle and in the same plane as each other so as to form part of a notional plane surface approximately parallel to the spar web 21.

The main section 20 is attached to the upper cover 13 by metal fasteners through holes 15 along the length of the upper cover 13 and corresponding holes in the upper spar cap 22. Similarly, the main section 20 is attached to the lower cover 14 by metal fasteners through holes (not shown) along the length of the lower cover 14 and corresponding holes in the lower spar cap 23.

The main section 20 is made of composite materials and can be manufactured using filament winding or fibre placement technology, which are known in the art. The main section 20 has rounded corners where the mounting flanges 24, 25 meet the spar caps 22, 23 and where the spar caps 22, 23 meet the spar web 21.

The front plate 30 is made up of three parts; a flat upper section 31, a lower flat section 32 and a recessed section 33 joining the two flat sections. The flat upper section 31 is at the same angle and in the same plane as the flat lower section 32 so they form part of a notional plane surface.

The recessed section 33 is also a flat section of the front plate 30 and is parallel to the flat upper 31 and lower 32 sections. It is joined to the flat sections 31, 32 by upper 33a and lower 33b joggle sections. The upper joggle section 33a extends back and slightly downwards from the lower end of the flat upper section 31 and the lower joggle section 33b extends back and slightly upwards from the upper end of the lower flat section 32.

The flat upper surface 31 is mounted against the upper mounting flange 24. It is attached using metal fasteners through holes 34 along the length of the flat upper surface 31 and corresponding holes in the upper mounting flange 24. The lower flat section 32 is mounted against the lower mounting flange 25. It is attached using metal fasteners through holes 35 along the length of the flat lower surface 32 and corresponding holes in the lower mounting flange 25. Hence, the recessed section 33 is approximately parallel to and in between the spar web 21 and the notional plane surface of the two flat sections 31, 32.

The main section 20 is attached to the upper 13 and lower 14 covers slightly inwards from the edge of the covers such that when the front plate 30 is attached to the mounting flanges 24, 25 of the main section 20, the outer sides of the flat upper 31 and lower 32 section are flush with the edge of the upper 13 and lower 14 covers.

The front plate 30 can be made from composite materials. It could also be metallic or made of fibre metal laminate.

A leading edge structure 60 is mounted to the wing box 10 in front of the front plate 30 and upper 13 and lower 14 covers. The leading edge structure 60 is attached to the wing box 10 by an upper leading edge structure 61 and a lower leading edge structure 62. The upper leading edge structure 61 has holes 63 along its length. Similarly, the lower leading edge structure 62 also has holes (not shown) along its length.

The upper leading edge structure 61 is attached at one edge to an upper angled bracket 40. The bracket 40 has two flange sections 41, 42 mounted at an angle of slightly less than 90 degrees to each other. The first bracket flange section 41 is attached underneath the upper leading edge structure 61 using metal fasteners through holes 63 and corresponding holes (not shown) in the first bracket flange section 41. The second bracket flange section 42 extends downwardly from the underside of the upper leading edge structure 61 at one edge.

The angle between the first 41 and second 42 bracket flange sections reflects the angle of the upper cover 13 at its front edge. Hence, if the upper cover 13 is designed to be at an angle of 5 degrees to the horizontal at its front edge, the angled bracket 40 will have an angle of 85 degrees. Hence, when the second bracket flange section 42 is attached to the front plate 30, the upper leading edge structure 61 follows the line of the upper cover 13.

The second bracket flange section 42 has slotted holes 43 along its length and is attached to the front plate 30 using metal fasteners through the slotted holes 43 and corresponding (normal) holes in the flat upper section 31 of the front plate 30.

Similarly, the lower leading edge structure 62 is attached at one edge to a lower angled bracket 50. The bracket 50 has two flange sections 51, 52 mounted at an angle of approximately 75 degrees to each other. The first bracket flange section 51 is attached on an upper side of the lower leading edge structure 62 using metal fasteners through holes in the lower leading edge structure 62 and corresponding holes (not shown) in the first bracket flange section 51. The second bracket flange section 52 extends upwardly from the underside of the lower leading edge structure 62 at one edge.

The angle between the first 51 and second 52 bracket flange sections reflects the angle of the lower cover 14 at its front edge. Here, the lower cover 14 is designed to be at an angle of 15 degrees to the horizontal at its front edge, so the angled bracket 50 has an angle of 75 degrees. Hence, when the second bracket flange section 52 is attached to the front plate 30, the lower leading edge structure 62 follows the line of the lower cover 14.

The second bracket flange section 52 has slotted holes 53 along its length and is attached to the front plate 30 using metal fasteners through the slotted holes 53 and corresponding (normal) holes in the flat lower section 32 of the front plate 30.

The slotted holes 43, 53 allow the leading edge structure 60 to be attached to the wing box 10 such that the outer surfaces of the leading edge structure 60 can follow the surface profile line and shape of the covers 13, 14. I.e. The metal fasteners (and therefore the corresponding holes in the flat sections 31, 32 of the front plate 30) can be located at different places along the length of the slotted holes 43, 53 so that the outer surfaces of the covers 13, 14 and the leading edge structure 60 line up. This allows for tolerance differences in the thickness of the covers 13, 14.

The rear spar 11 (not shown) has a similar construction to front spar 12. The rear spar 11 is also attached to upper 13 and lower 14 covers of the wing box 10 with the spar caps 22, 23 extending outwards. A trailing edge structure (not shown) can be mounted at the rear edge of the wing box 10 in a similar way to the mounting of the leading edge structure 60 at the front edge of the wing box 10.

The wing box 10 is assembled by firstly attaching the main section 20 of the front spar 12 to the upper 13 and lower 14 covers and attaching the leading edge structure 60 to the front plate 30 using angled brackets 40, 50. Then, the front plate 30 is attached to the main section 20 of the front spar 12. Similarly, the trailing edge structure is attached to a rear plate (equivalent to the front plate 30) of the rear spar 11 before the rear plate of the rear spar 11 is attached to the main section of the rear spar 11.

Systems cables can be included in the spars 11, 12 by containing them in the main C-shaped sections 20 before the front (or rear) plates 30 are attached.

Systems cables can also be run along outside of the recessed sections 33 of the front (or rear) plates 30 such that the cables can be contained on one side of the notional plane of the flat upper 31 and lower 32 sections of the front (or rear) plates 30.

In use, fuel is contained in a fuel area 70 (shown in FIG. 3) located inwards from the front 12 and rear 11 spars. In other words, the fuel is located on the inside of the spar webs 21. The spar caps 22, 23 extend outwards from the spar webs 21.

Figure 4:
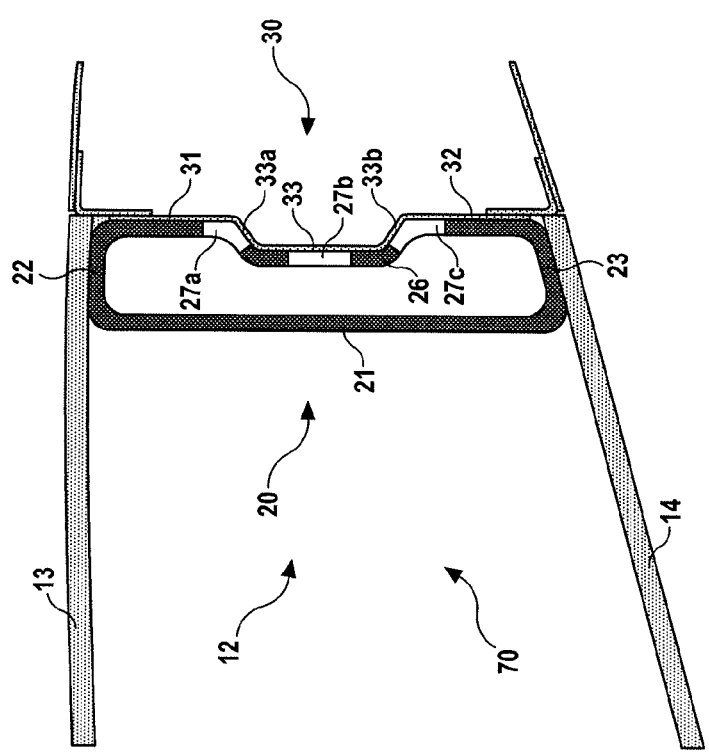
FIG. 4 is a side view of a part of a wing box according to another embodiment of the present invention.

Alternatively, as shown in FIG. 4, the front 12 and rear 11 spars can be made such that the spars have a mounting face 26 extending between the upper and lower spar caps. The spars could be manufactured as complete box-sections including the mounting face 26. The mounting face 26 has window apertures 27a, 27b and 27c in it.

Alternatively, the front 12 and rear 11 spars can be made in a box shape without the front (or rear) plates 30. In other words, a box-section spar is made using a single piece construction. If made from composite materials, the box-section spar can be manufactured using a bottle core moulding process. Such a process is known in the art and involves using an inflatable sacrificial mandrel tool.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A wing structure, wherein
    the wing structure comprises;
        an upper covering,
        a lower covering, and
        a spar, the spar comprising;
            a spar web,
            an upper spar cap attached to the upper covering, and
            a lower spar cap attached to the lower covering,
            a face spaced apart from the spar web extending between the upper and lower spar caps,
    the wing structure is arranged to contain fuel in a fuel containment area between the upper and lower coverings on one side of the spar web, and
    wherein the upper and lower spar caps extend from the spar web only on the other side of the spar web to the fuel containment area.

2. A wing structure as claimed in claim 1, wherein the spar caps are attached to the coverings by metal fasteners extending through the thickness of the caps and coverings.

3. A wing structure as claimed in claim 1, wherein the coverings are made from composite material.

4. A wing structure as claimed in claim 1, wherein the web of the spar is made from composite material.

5. A wing structure as claimed in claim 1, wherein
    the wing structure comprises two spars as defined in claim 1, such that the wing structure has;
        a front spar located towards a leading edge of the wing structure and comprising a spar web, an upper spar cap attached to the upper covering and a lower spar cap attached to the lower covering, and
        a rear spar located towards a trailing edge of the wing structure and comprising a spar web, an upper spar cap attached to the upper covering and a lower spar cap attached to the lower covering,
    wherein the fuel containment area is between the spar webs of the front and rear spars,
    wherein the upper and lower spar caps of the front spar extend from the spar web of the front spar only on a forward facing side of the spar web, and
    wherein the upper and lower spar caps of the rear spar extend from the spar web of the rear spar only on a rearward facing side of the spar web.

6. A wing structure as claimed in claim 1, wherein systems cables are run along a length of the spar in between the spar web and the face.

7. A wing structure as claimed in claim 1, wherein the face forms part of the spar, arranged to join the upper and lower spar caps, such that the spar has a box-shaped section.

8. A wing structure as claimed in claim 1, wherein the face is an integral part of the spar.

9. A wing structure as claimed in claim 1, wherein the upper spar cap comprises a mounting flange and the lower spar cap comprises a mounting flange, the mounting flanges extending away from the respective spar cap towards the opposite spar cap and wherein the face is at least partly defined by a joining structure attached to the mounting flanges of the upper and lower spar caps.

10. A wing structure as claimed in claim 1, wherein a plate is mounted on the face.

11. A wing structure, wherein
    the wing structure comprises;
        an upper covering,
        a lower covering, and
        a spar, the spar comprising;
            a spar web,
            an upper spar cap attached to the upper covering, and
            a lower spar cap attached to the lower covering,
            a face spaced apart from the spar web extending between the upper and lower spar caps,
    the wing structure is arranged to contain fuel in a fuel containment area between the upper and lower coverings on one side of the spar web,
    wherein the upper and lower spar caps extend from the spar web only on the other side of the spar web to the fuel containment area,
    wherein the upper spar cap comprises a mounting flange and the lower spar cap comprises a mounting flange, the mounting flanges extending away from the respective spar cap towards the opposite spar cap and wherein the face is at least partly defined by a joining structure attached to the mounting flanges of the upper and lower spar caps, and,
    wherein a leading or trailing edge structure can be mounted on the plate or joining structure before the plate/joining structure is mounted to the rest of the wing structure.

12. A wing structure as claimed in claim 11, wherein the leading or trailing edge structure is mounted on the plate/joining structure using an angled bracket, the bracket having slotted attachment holes for fixing to the plate.

13. A wing structure as claimed in claim 1, wherein the face has apertures therethrough.

14. A wing structure as claimed in claim 1, wherein the face has a recessed section.

15. A wing structure as claimed in claim 14, wherein systems cables are run along a length of the spar within the recess of the recessed section.

16. An aircraft comprising a wing structure according to claim 1.

17. A method of assembly of a wing structure according to claim 1, the method comprising the steps of:
    fully assembling a leading or trailing edge structure,
    attaching the leading/trailing edge structure to a mounting structure, and then
    attaching the mounting structure to a spar of the wing structure.

18. An aircraft wing spar suitable for use in the wing structure of claim 1.

* * * * *